United States Patent [19]

Chemla et al.

[11] 4,254,461
[45] Mar. 3, 1981

[54] METHOD AND APPARATUS FOR DETERMINING LINKING ADDRESSES FOR MICROINSTRUCTIONS TO BE EXECUTED IN A CONTROL MEMORY OF A DATA-PROCESSING SYSTEM

[75] Inventors: Claude N. Chemla, St. Cloud; Jean M. Bourrez, Versailles, both of France

[73] Assignee: Compagnie International l'Informatique-CII Honeywell Bull, Paris, France

[21] Appl. No.: 897,134

[22] Filed: Apr. 17, 1978

[30] Foreign Application Priority Data

Apr. 19, 1977 [FR] France .................. 77 11744

[51] Int. Cl.³ .................................... G06F 9/26
[52] U.S. Cl. ................................... 364/200
[58] Field of Search ... 364/200 MS File, 900 MS File

[56] References Cited

U.S. PATENT DOCUMENTS

| | | | |
|---|---|---|---|
| 3,875,565 | 4/1975 | Endou et al. | 364/200 |
| 3,991,408 | 11/1976 | Holmes et al. | 364/900 |
| 4,001,788 | 1/1977 | Patterson et al. | 364/200 |
| 4,038,643 | 7/1977 | Kim | 364/200 |
| 4,057,850 | 11/1977 | Kaneda et al. | 364/200 |
| 4,075,687 | 2/1978 | Nissen et al. | 364/200 |
| 4,080,651 | 3/1978 | Cronshaw et al. | 364/200 |
| 4,110,822 | 8/1978 | Porter et al. | 364/200 |

Primary Examiner—Harvey E. Springborn
Attorney, Agent, or Firm—Lowe, King, Price and Becker

[57] ABSTRACT

Linking addresses of microinstructions contained in a control memory of a microprogrammed data processing system are determined. The system includes storage elements for predetermined signals and an address register. Each microinstruction includes a preparation phase followed by an execution phase. The microinstructions occur in cycles so microinstruction cycle (n+1) follows microinstruction cycle n. The microinstruction of cycle n has: (a) a first bit field designating a linking address to the microinstruction of cycle (n+1) unless modified during cycle n, (b) a second bit field selectively designating which storage elements contain signals that can control selected bits of the first field, and (c) a third bit field for selectively enabling changes to be made in the storage elements. During cycle n, signals in certain storage elements, selected by the third field are selectively changed, the first field is selectively modified in response to signals in storage elements selected by the second field, the modified first field is stored in the address register, and then the address in the address register is supplied to the control memory. As a result of these operations, during the execution phase of cycle (n+1), the microinstruction at the address supplied to the control memory during cycle n is executed.

16 Claims, 10 Drawing Figures

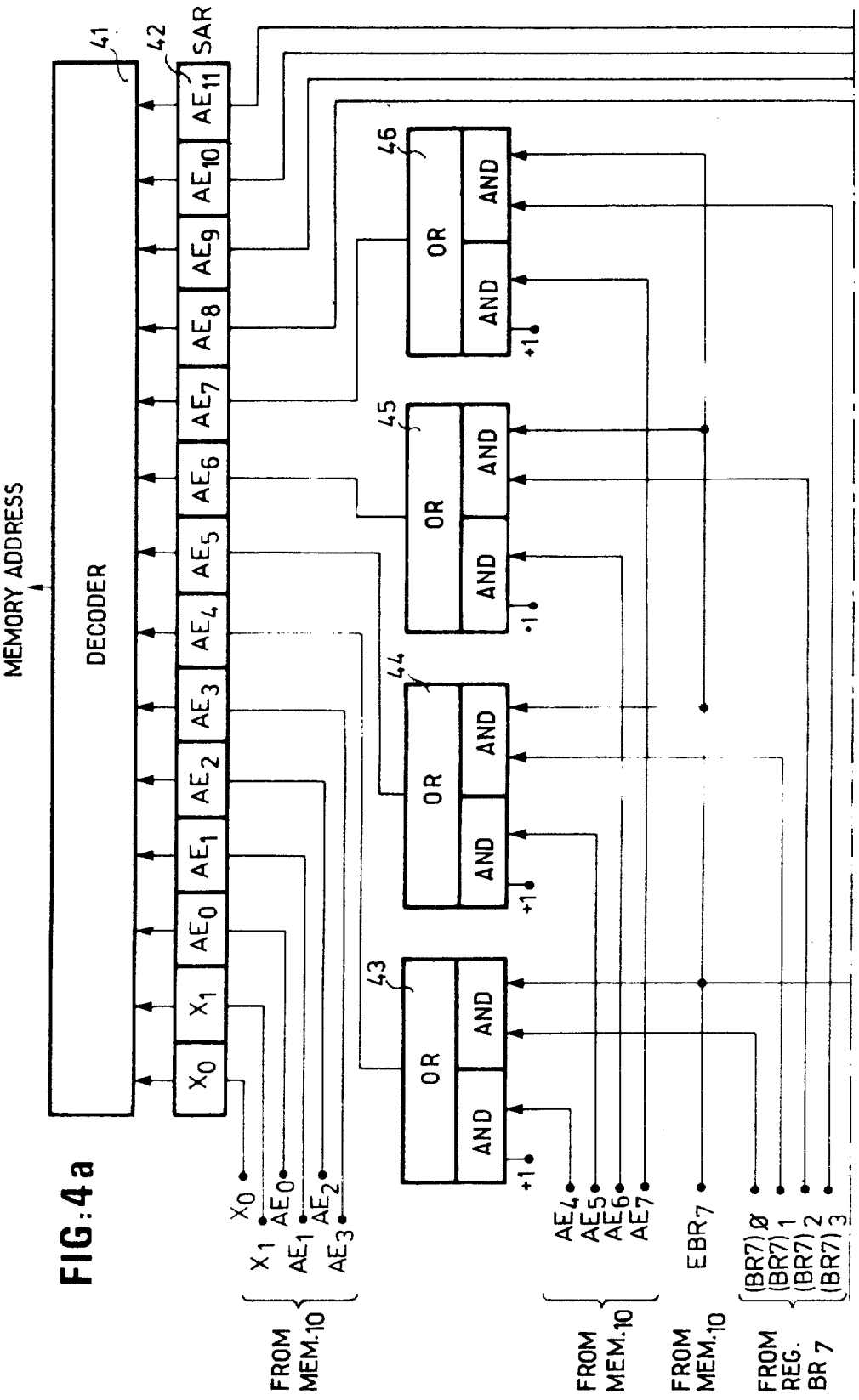

FIG: 8

METHOD AND APPARATUS FOR DETERMINING LINKING ADDRESSES FOR MICROINSTRUCTIONS TO BE EXECUTED IN A CONTROL MEMORY OF A DATA-PROCESSING SYSTEM

BACKGROUND OF THE INVENTION

The present invention relates to a method of and apparatus for linking microinstructions to be executed in a control memory of a microprogrammed computer. In particular, the invention relates to microinstruction linking control arrangements including a provision for overlap between the execution of a current microinstruction and the phase of preparing for the next microinstruction to be executed. The invention is applicable to systems for processing or transmitting data and is of particular utility in large computer systems where tests relating to linking microinstructions together take significant time and often are completed too late in a microinstruction execution cycle to be considered. In computers which operate in the overlap mode, this delay in preparing for a microinstruction results in missed execution of the microinstruction.

BRIEF DESCRIPTION OF THE INVENTION

In accordance with the invention, the address of a microinstruction contained in a control memory is either: (1) transmitted as an initial address for carrying out the microprogram directly from an address register to the control memory, or (2) produced by a logic unit that links the microinstructions in the control memory together. The latter case is termed the current linking address in the control memory and points to addresses of the microinstructions in the microprogram subsequent to the first address.

One object of the invention is to provide an apparatus and method which enables microinstructions to be prepared and executed in three modes which are: a prepared linking mode, a direct linking mode and a mixed linking mode.

In the prepared linking mode, a linking modification indicated by a microinstruction field is prepared for during the preceding microinstructions by loading modification bits into special flip-flops or registers. These loading operations may be the result of: a specific setting order; a modification of the former flip-flop contents, as dictated by the test results; a transfer of the contents of another flip-flop or another register; or the result of a calculation. The prepared linking mode is particularly suitable for cases where it is possible, without involving non-working cycle time, to delay the linking action indicated by the results of currently executed microoperations, by means of a previous storage operation. Linking is determined at a later stage, as dictated by this storage operation, so there is no danger of an undesired microinstruction being read, in view of an overlap between execution of microinstruction n and the preparation for the next microinstruction n+1.

In certain cases, a penalty may have to be paid in terms of execution time and in the number of microinstruction words if the result of a test on a microinstruction field is stored in a flip-flop before the linkage indicated by this test result is ordered. This is particularly the case with floating execution microprograms in which it is often desired to give linking up orders in a microinstruction as a function of the results obtained at the end of the same microinstruction. An obstacle to such a linking is that there is an overlap in the same cycle between reading microinstruction n+1 and carrying out microinstruction n. Direct linking involves optimizing the case where the tests on the microinstruction fields which have a direct effect on linking are not successful. During execution of microinstruction n, microinstruction n+1, which is to be executed after microinstruction n, if the tests are unsuccessful, is read. It is most probable that the tests on the microinstruction fields will be unsuccessful. If, however, the tests are successful, an unwanted microinstruction will have been read at the end of the cycle. No microinstruction will be executed during the next cycle and the microinstruction actually required for linkage will be read.

In direct linking, a machine cycle will be lost in execution if tests on the test fields of the microinstruction have a direct effect on the microinstruction linking orders. Such orders are of great benefit for tests to determine: errors, abnormal format, or anomalies of any kind. The benefit occurs because the orders enable tests to be performed immediately, without employing linking flip-flops, and with virtually no time penalty; there is only a penalty in the unlikely event of anomalies. Similarly, the orders enable the probable penalty to be reduced whenever, in a microinstruction, linking is ordered as a function of the results of executing the same microinstruction, presuming equal probability for all the results of execution. Finally, the mixed linking mode enables prepared linking orders and direct linking orders to be combined.

The object of the invention which has just been set forth is achieved by providing a microinstruction with two fields which define a link which is to be made to the next microinstruction; the fields are:

field AE that indicates the linking address, and field ME that indicates the linking mode; there are additional fields, namely:

test order fields $CM_1$ and $CM_2$, and fields $B_1$, $B_2$, $B_3$, $B_4$, respectively ordering inputs to four flip-flops (designated $BB_1$, $BB_2$, $BB_3$, $BB_4$).

If the field ME for the linking mode is all zeros, the address of the next microinstruction is actually indicated by the linking address AE.

If linking mode field ME indicates a linkage modification (field ME$\neq$0), the address of the next instruction is determined by the linking address AE, as modified by the effect of field ME on a pair of test result flip-flops (designated $F_1$, $F_2$), on the four flip-flops designated $BB_1$ to $BB_4$, and on a register designated $R_7$ containing the linkage modifying bits.

The above and still further objects, features and advantages of the present invention will become apparent upon consideration of the following detailed description of one specific embodiment thereof, especially when taken in conjunction with the accompanying drawing.

DETAILED DESCRIPTION OF THE INVENTION

Figure 1:
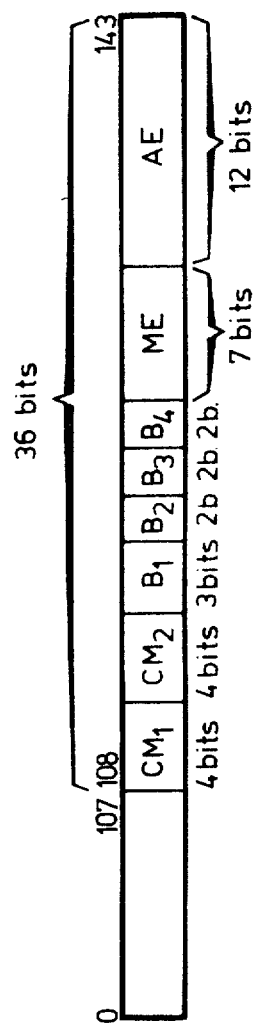
FIG. 1 shows the format of a microinstruction.

The format of the microinstruction shown in FIG. 1 is 144 bits long. The invention can be used used with any suitable microprogrammed data processor of the type broadly described on pages 318-320 of Condensed Computer Encyclopedia (1969) McGraw-Hill. It is to be understood that the length and format of the illustrated microinstructions are merely exemplary and that the microinstruction can have any suitable length and format, depending upon the computer with which it is used. Only the areas necessary for an understanding of the invention are shown. The test order fields $CM_1$ and $CM_2$ are each four bits long. Field $CM_1$ begins at bit 108 and field $CM_2$ begins at bit 112. They enable a test to be selectively performed on the output of an arithmetic logic unit which processes data in octets, i.e., eight bit bytes, or on the output of an arithmetic logic unit which processes double data words. The tests involve, for example, performing nullity tests, positive or zero tests, negative tests, and tests on the carry output of the two arithmetic logic units.

Field $B_1$ is three bits long and begins at bit 116. Its function is to control the loading of a modification flip-flop $BB_1$, FIGS. 3 and 6. This field may have the following meanings:

(1) Unconditional complementing of the former contents of flip-flop $BB_1$.

(2) Complementing of flip-flop $BB_1$ if the test performed on $CM_1$ is satisfied.

(3) Complementing of flip-flop $BB_1$ if the test performed on $CM_2$ is satisfied.

(4) Resetting of flip-flop $BB_1$ to zero.

(5) Feeding into flip-flop $BB_1$ the result of the test ordered by field $CM_1$.

(6) Feeding into flip-flop $BB_1$ the result of the test ordered by field $CM_2$.

Field $B_2$ is two bits long and begins at bit 119. Its function is to control the loading of the linkage modification flip-flop $BB_2$, FIGS. 3 and 7. This field may have the following meanings:

(1) Feeding into flip-flop $BB_2$ the result of the test ordered by field $CM_1$.

(2) Feeding into flip-flop $BB_2$ the result of the test ordered by field $CM_2$.

(3) Feeding into flip-flop $BB_2$ the result of a logic OR correlation between the former content of flip-flop $BB_2$ and the result of the test ordered by field $CM_2$.

Figure 3:
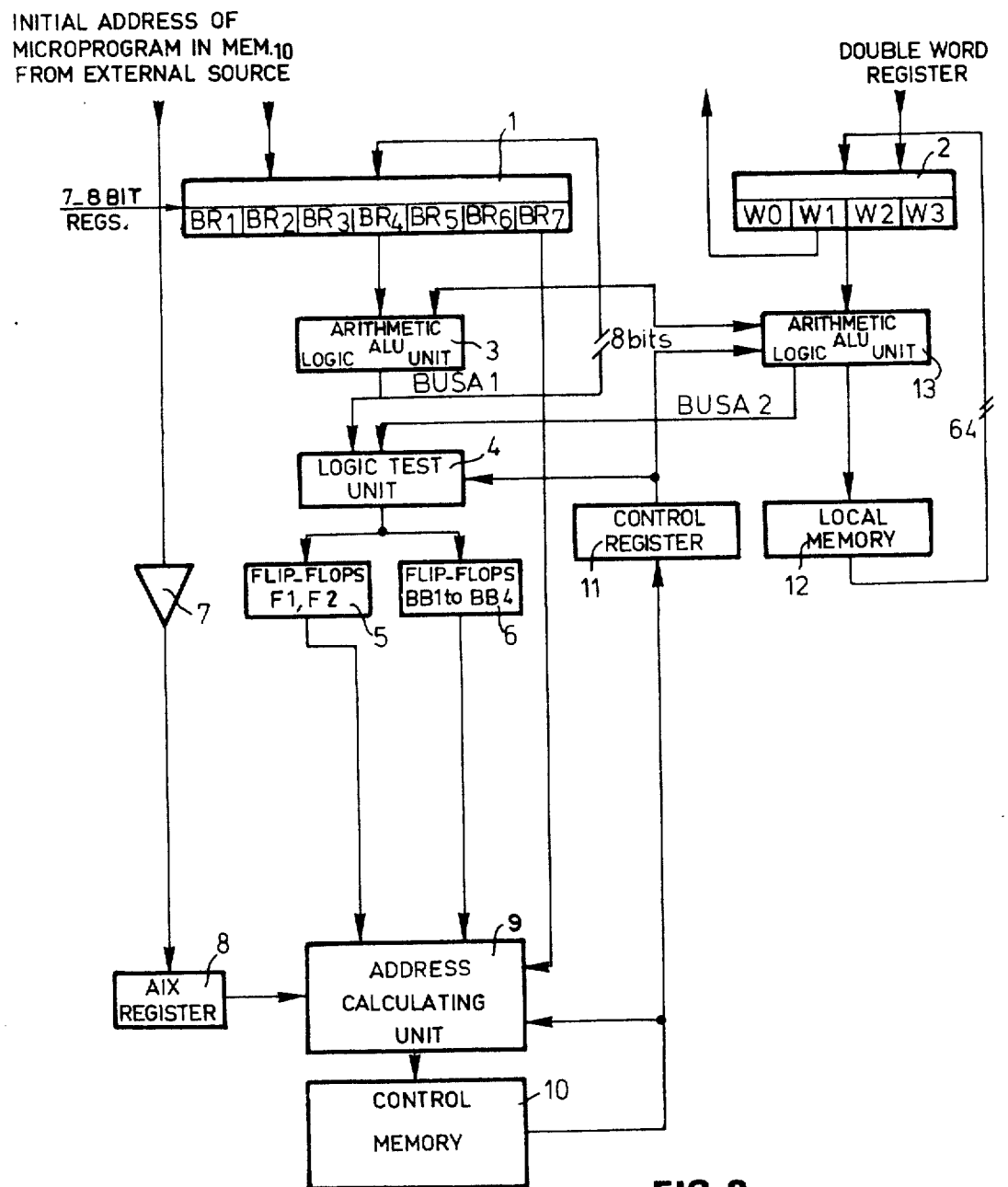
FIG. 3 is a block diagram showing the overall linkage apparatus, FIGS. 4A and 4B together, are a block diagram of the address calculating unit of FIG. 3.
Figure 7:
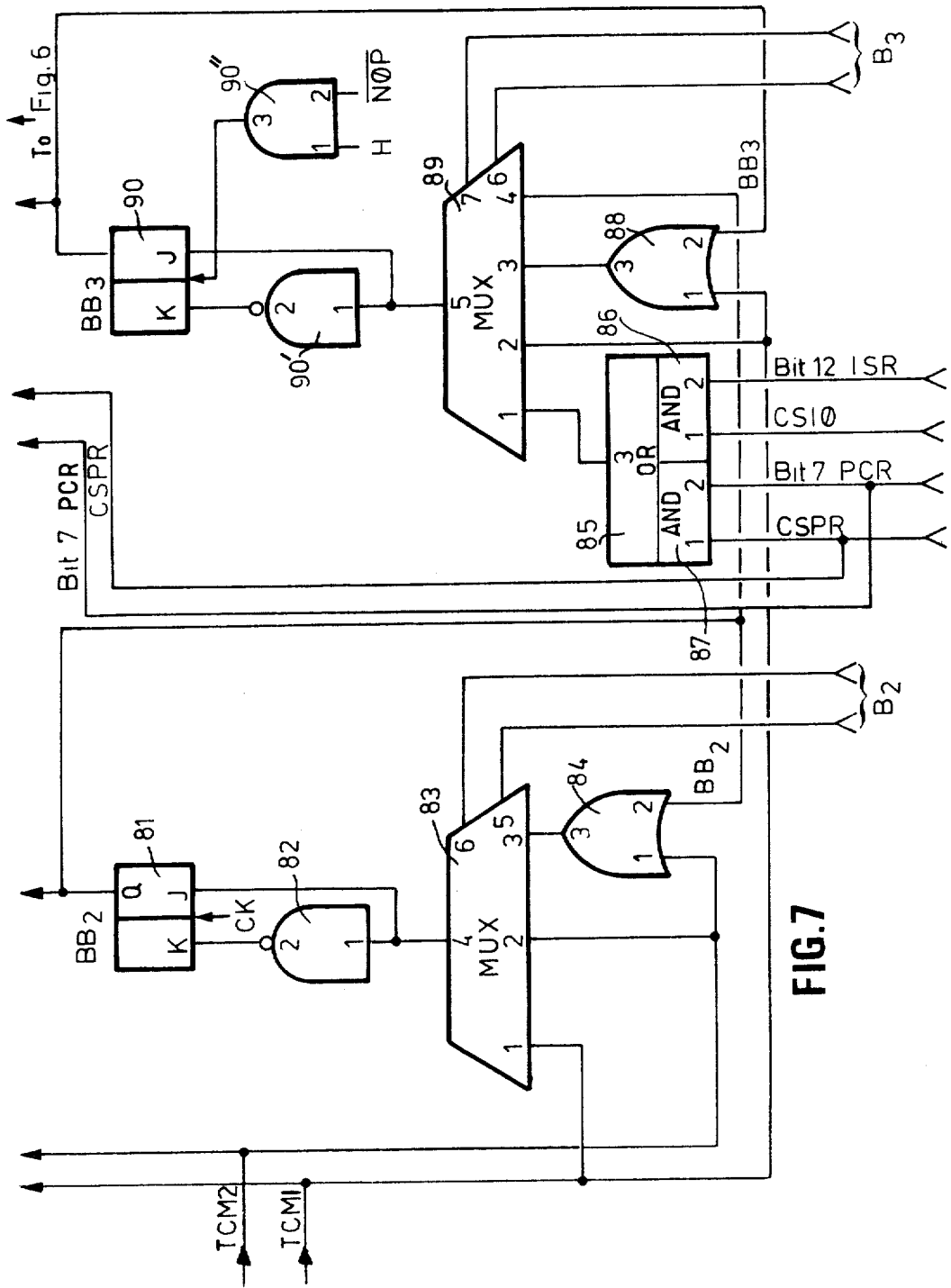
Figure 8:
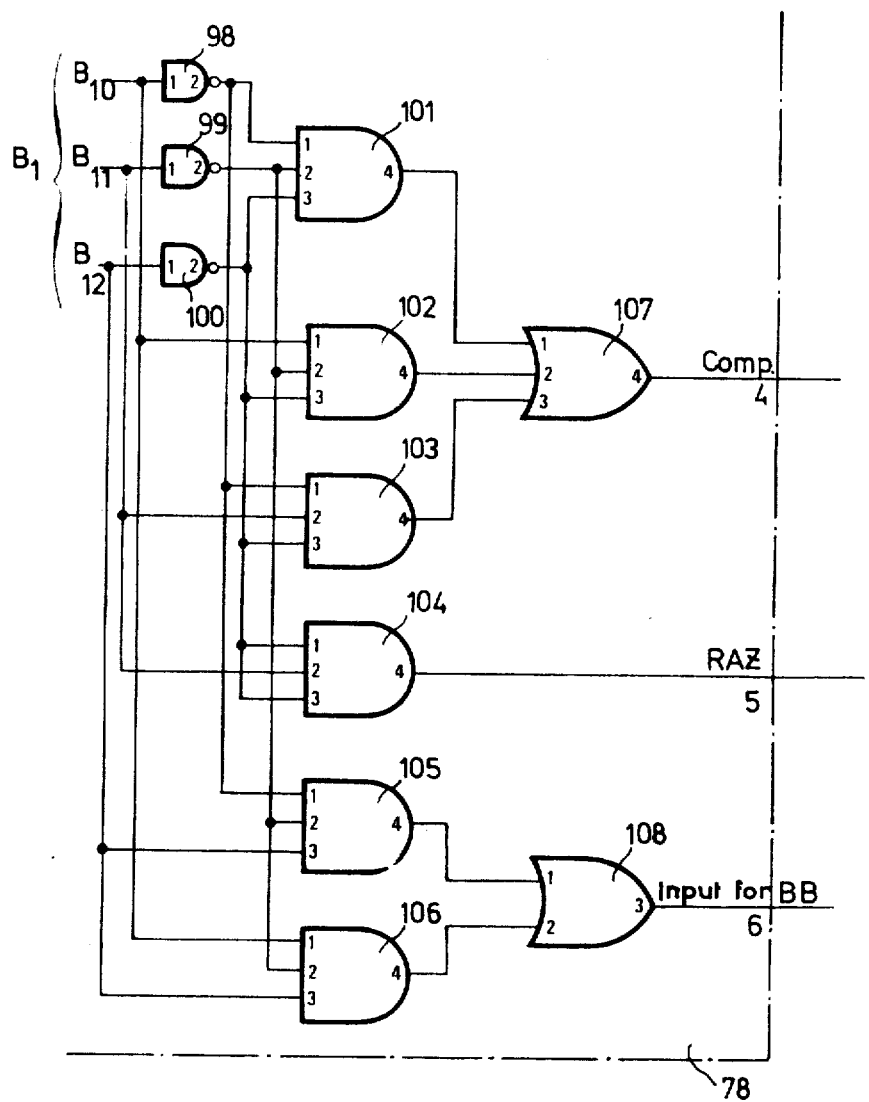
FIG. 8 is a circuit diagram of the decoder illustrated in FIG. 6.

Two bit field $B_3$, which begins at bit 121, controls the loading of a linkage modification flip-flop $BB_3$, FIGS. 3 and 7. Field $B_3$ may have the following meanings:

(1) Input into flip-flop $BB_3$, as dictated by two secondary orders CSIO and CSPR, whose specific action bears no direct relation to the process of linking the microinstructions and which are respectively derived from instruction and program control registers of a prior art data processor, not shown, if there are no secondary orders the operation does not take place (NOP), if secondary order CSIO is present, bit 12 of instruction register ISR is to be transferred to flip-flop $BB_3$, if secondary order CSPR is present, bit 7 of program control register PCR is to be transferred to flip-flop $BB_3$.

(2) Input into flip-flop $BB_3$ of the result of the test ordered by field $CM_1$.

(3) Input into flip-flop $BB_3$ of the result of a logic OR correlation between the former content of flip-flop $BB_3$ and the result of the test ordered by field $CM_1$.

(4) Input into flip-flop $BB_3$ of the former content of flip-flop $BB_2$.

Figure 6:
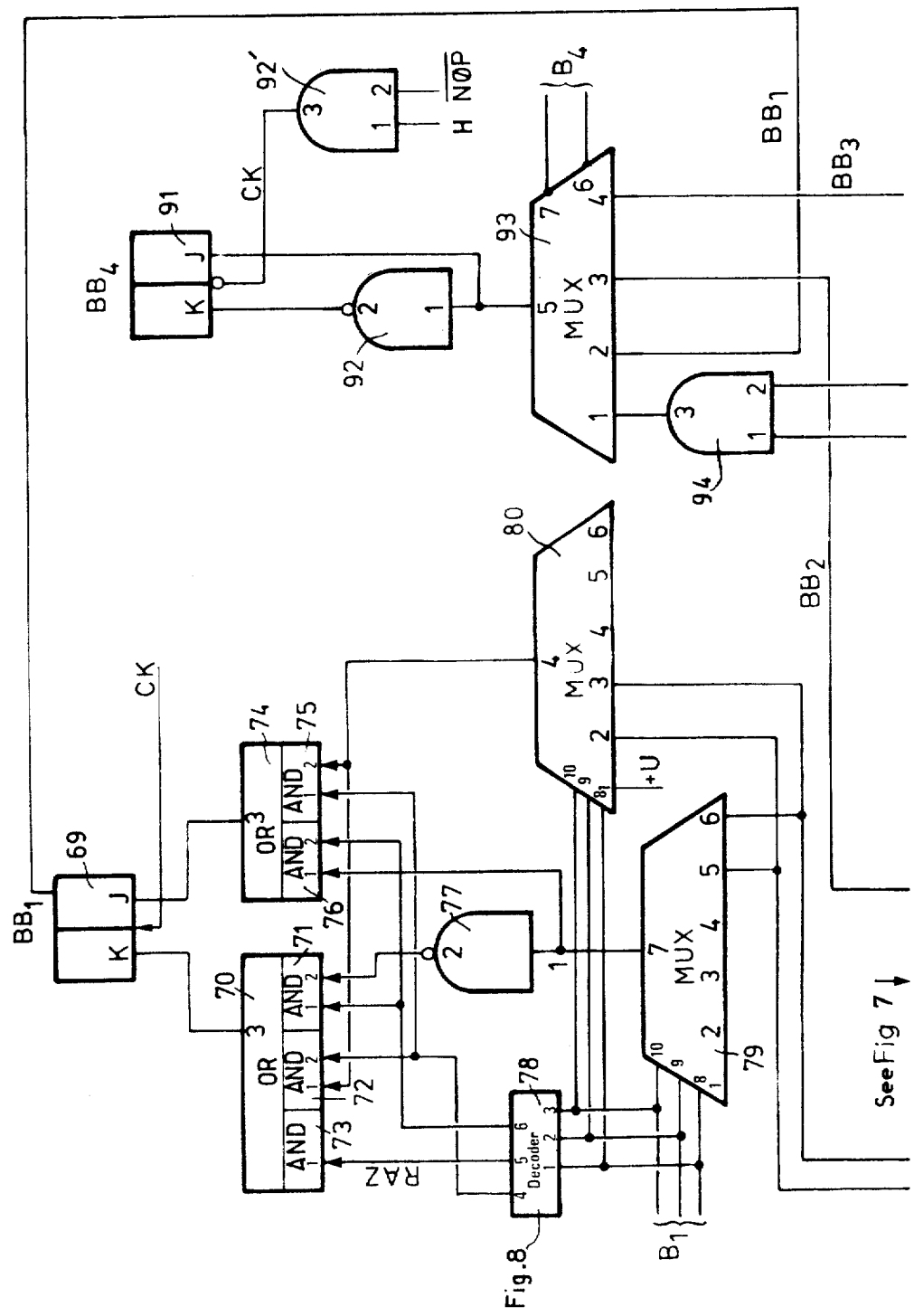
FIGS. 6 and 7 together, are a block diagram of flip-flops $BB_1$-$BB_4$ and the portion of the logic test unit associated with them.

Two bit field $B_4$, which begins at bit 123, controls the loading of linkage modification flip-flop $BB_4$, FIGS. 3 and 6. This field may have the following meanings:

(1) Input into flip-flop $BB_4$ depending upon whether the secondary order CSPR is present, if the secondary order is not present, the operation is not performed (N$\phi$P), if there is a secondary order CSPR, bit 7 of register PCR is transferred to flip-flop $BB_4$.

(2) Input into flip-flop $BB_4$ of the former contents of flip-flop $BB_1$.

(3) Input into flip-flop $BB_4$ the former contents of flip-flop $BB_2$.

(4) Input into flip-flop $BB_4$ the former contents of flip-flop $BB_3$.

The two remaining areas ME and AE indicate linkage to the next microinstruction to be executed.

Figure 2:
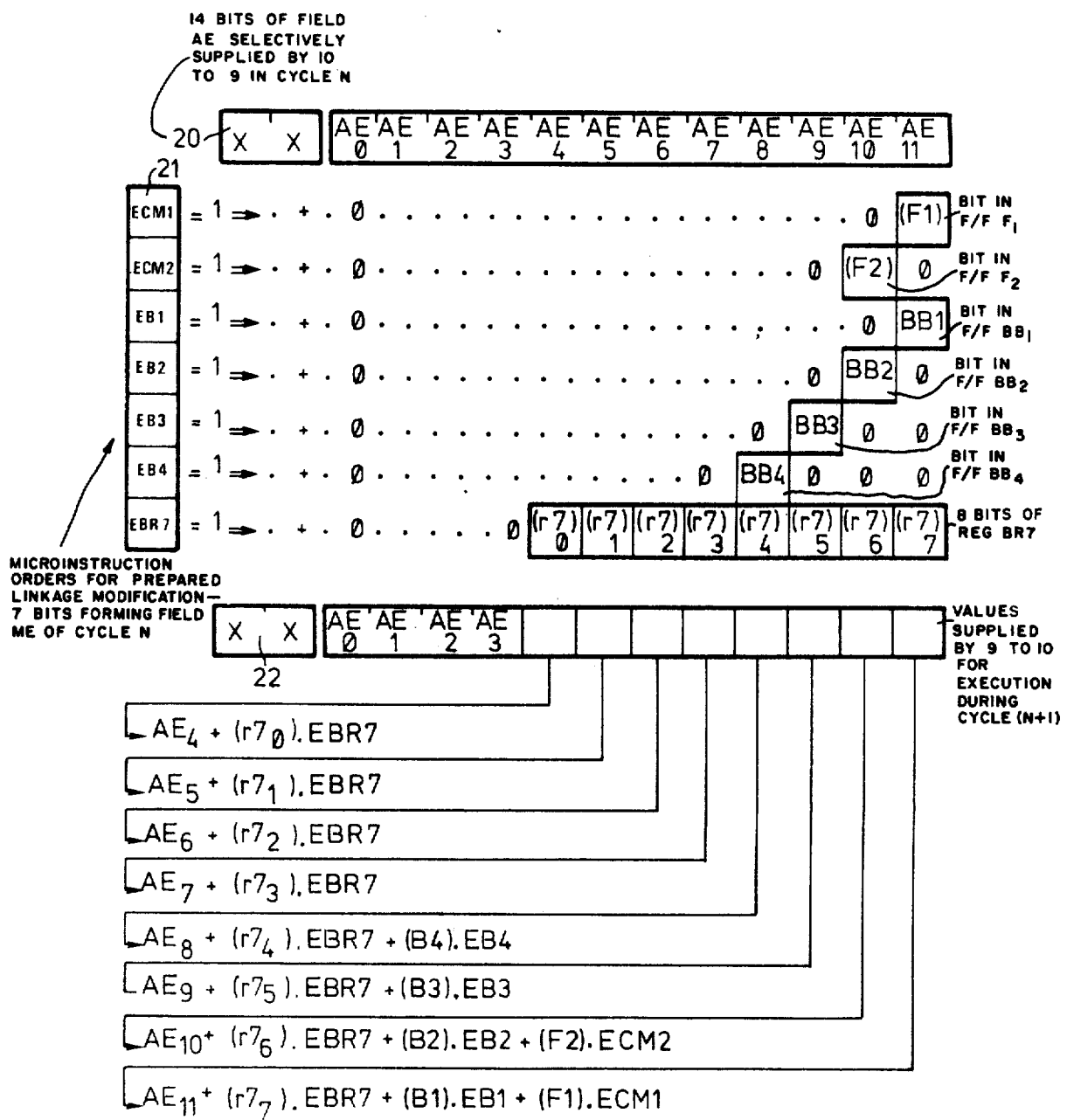
FIG. 2 shows, in simplified form, a control memory associated with control circuits and linkage modification circuits.

14 Bit long field AE begins at bit 132 and indicates the linking address before a linking address is modified by the linking mode ordering field ME, FIG. 2. The 12 least significant bits (indicated by $AE_0$-$AE_{11}$, FIG. 2) of field AE contain the address for linking to the next microinstruction the least and most significant bits are respectively $AE_{11}$ and $AE_0$. The two most significant bits (x, x) of the 14 bit address, indicated by field AE remain the same as those given for the initial execution address.

Seven bit long field ME begins at bit 125 and indicates the linking mode; each of the bits ECM, $ECM_2$, $EB_1$, $EB_2$, $EB_3$, $EB_4$ and $EBR_7$ (FIG. 2) in control field ME has a specific modifying action on the linking address AE. Bits $ECM_1$ and $ECM_2$ define the direct linking mode as a function of tests respectively ordered by fields $CM_1$ and $CM_2$; the test results are stored in the storage elements flip-flops $F_1$ and $F_2$. Bits $EB_1$, $EB_2$, $EB_3$, $EB_4$ and $EBR_7$ define the prepared linkage mode and permit address field AE to be modified by the contents of flip-flops $BB_1$, $BB_2$, $BB_3$, $BB_4$ (which indicate if there is to be a linkage modification) and of octet (eight bit) register $BR_7$, FIG. 3. Thus the microinstruction of cycle n illustrated in FIG. 1 can be considered as including, inter alia, first, second and third bit fields. Field AE, the first field, designates a linking address to the microinstruction of cycle (n+1), unless modified during the preparation phase of cycle n. Field ME, the second field, selectively designates which of storage elements $F_1$, $F_2$, $BB_1$-$BB_4$, and $BR_7$ contain signals that can alter selected bits of field AE. The third field can be considered as being divided into six subfields, viz: $CM_1$, $CM_2$ and $B_1$-$B_4$. The value of the third field enables changes to be selectively made in certain of the storage elements, namely flip-flops $F_1$, $F_2$, $BB_1$-$BB_4$. The changes in flip-flops $F_1$ and $F_2$ are made in response to predetermined conditions in the values derived from a pair of arithmetic logic units, i.e., units 3 and 13 (FIG. 3), while fields $CM_1$ and $CM_2$ respectively have predetermined values. The value of a first predetermined bit position (bit $AE_{11}$) in the first field stored in address register 42 (FIG. 4A), included in address calculating unit 9, is thus controlled in response to the value in one of the storage elements (element $F_1$) in response to a first bit of the second field having a predetermined value, i.e., in response to bit $ECM_1$ of field ME having a binary one value. The value of bit $AE_{11}$ in the field stored in register 42 is also controlled in response to the value in the storage element formed by flip-flop $BB_1$ in response to bit $EB_1$ of field ME having a binary one value. The value of a second predetermined bit position $AE_4$ in address register 42 is controlled in response to the value in a further storage element, bit zero of register $BR_7$, and a predetermined value of a second bit of the second field, i.e., bit $EBR_7$ of field ME having a binary one value. p FIG. 2 also indicates the general linking principle.

In the prepared linking mode, a linking change indicated by field AE of a microinstruction may have been prepared for in the course of the preceding microinstructions by loading any of the storage elements in flip-flops $BB_1$, $BB_2$, $BB_3$, $BB_4$ or register $BR_7$. These loading operations may be the result of: (1) a setting order, (2) a need to modify former contents, as dictated by the results of tests $CM_1$ and/or $CM_2$, (3) a transfer of the contents of another flip-flop or another register, or (4) a result of a calculation. Orders $EB_1$, $EB_2$, $EB_3$, $EB_4$ and $EBR_7$ for prepared linkage modifications which are given in a microinstruction, shown by reference numeral 21 in FIG. 2, modify the linking address by the contents of flip-flops $BB_1$, $BB_2$, $BB_3$, $BB_4$ or register $BR_7$, at the end of the preceding microinstruction. Generally, the binary locations in field AE (shown by reference numeral 20 in FIG. 2) which are capable of being modified by the contents of flip-flops $BB_1$–$BB_4$ or register $BR_7$ contain zeros to prevent the "logic OR" effect of the change from being masked.

The following example shows the effect of an order $EBR_7$ alone:

| AE X | X X X X φ φ φ |
| $BR_7$ | φ φ φ φ A B C D |

(In this and the following examples, the least significant bit position $AE_{11}$ of field AE is at the right most position, and the adjacent bit positions $AE_{10}$, $AE_9$, etc. progress to the left. Similar nomenclature is used for fields in register $BR_7$, and flip-flops $BB_1$–$BB_4$, $F_1$ and $F_2$, FIGS. 3 and 5.)

The effective address of the next microinstruction will be:

| X | X X X X A B C D |

The following example shows the effect of an order $EB_1$ and an order $EB_3$:

| AE X | X φ X φ |
| $BB_1$ | Y |
| $BB_3$ | Z |

The effective address of the next microinstruction will be:

| X | X Z X Y. |

In the direct linking mode, the implementing logic is such as to take as an optimum the case where the tests $CM_1$ and/or $CM_2$, respectively on flip-flops $F_1$ and $F_2$, which have a direct effect on the linking, are unsuccessful; that is, the direct linking mode is executed if:

$$F_1 + F_2 = \Sigma_i F_i = 0.$$

While the microinstruction n is being executed, the microinstruction n+1 to which the link should have been made is read if $\Sigma_i F_i = 0$. The expectation is that tests $CM_1$ and/or $CM_2$ will be unsuccessful so that the direct linking mode will not be implemented.

However, if the direct linking mode test is successful, i.e., if $$F_1 = 1 \text{ and/or } F_2 = 1, \text{ whereby } \Sigma_i F_i = 1,$$

the microinstruction n+1 will be read at the end of cycle n but will not be carried out in the next cycle, during which the microinstruction actually required for the linkage is read. One machine cycle is thus lost if either or both of tests $CM_1$ and $CM_2$ are successful, if these tests act directly on the linking in response to orders $ECM_1$ and $ECM_2$.

The following example is an example of orders $ECM_1$ and $ECM_2$:

| AE X | X φ φ |
| Result of test $CM_1$ | $F_1$ |
| Result of test $CM_2$ | $F_2$ |
| Effective address of next microinstruction X | X $F_2 F_1$. |

The mixed linking mode enables the effects resulting from prepared linking orders and direct linking orders to be combined. For example, if

| AE X | X φ X φ φ |
| Result of test $CM_2$ | $F_2$ |
| $BB_1$ | Y |
| $BB_4$ | Z |
| Effective address of the next microinstruction X | X Z X $F_2$Y |

From the above and from what is shown in FIG. 2, it is seen that the modification to the least significant bit $AE_{11}$ in field AE corresponds to the logic equation:

$$AE_{11} + (BR_7)_7 \cdot EBR_7 + BB_1 \cdot EB_1 + F_1 \cdot ECM_1.$$

The modification to bit $AE_{10}$ in field AE corresponds to the logic equation:

$$AE_{10} + (BR_7)_6 \cdot EBR_7 + BB_2 \cdot EB_2 + F_2 \cdot ECM_2.$$

The modification to bit $AE_9$ in field AE corresponds to the logic equation:

$$AE_9 + (BR_7)_5 \cdot EBR_7 + BB_3 \cdot EB_3.$$

The modification to bit $AE_8$ in field AE corresponds to the logic equation:

$$AE_8 + (BR_7)_4 \cdot EBR_7 + BB_4 \cdot EB_4.$$

The modification to bit $AE_7$ in field AE corresponds to the logic equation:

$$AE_7 + (BR_7)_3 \cdot EBR_7.$$

The modification to bit $AE_6$ in field AE corresponds to the logic equation:

$$AE_6 + (BR_7)_2 \cdot EBR_7.$$

The modification to bit $AE_5$ in field AE corresponds to the logic equation:

$$AE_5 + (BR_7)_1 \cdot EBR_7.$$

The modification to bit $AE_4$ in field AE corresponds to the logic equation:

$$AE_4 + (BR_7)_\phi \cdot EBR_7.$$

In these equations the sign · represents the logic "AND" operator and the sign + represents the logic "OR" operator.

The components to implement the operators which have just been stated are shown in the block diagram of FIG. 3, the details of which are illustrated in FIGS. 4–9. In FIG. 3, flip-flops $F_1$ and $F_2$ (FIG. 5) are included in a two flip-flop register 5, while flip-flops $BB_1$-$BB_4$ (FIGS. 6 and 7) are included in a four flip-flop register 6. The inputs of registers 5 and 6 are controlled from a logic test unit 4 responsive to the fields $CM_1$, $CM_2$, and $B_1$-$B_4$ of a microinstruction stored in a control register 11, after having been read from control memory 10. The outputs of registers 5 and 6 feed the inputs of address calculating unit 9 with signals indicating the states of flip-flops $F_1$, $F_2$ and $BB_1$ to $BB_4$; these signals modify the address field AE in the address calculating unit 9, illustrated in detail in FIGS. 4A and 4B. Via a register AIX, address calculating unit 9 receives an address derived by a source external to the arrangement of the invention, which address may point directly to a first control memory microinstruction, which may be the initial address of a microprogram in the control memory 10. Address calculating unit 9 also receives the contents of an eight-bit register $BR_7$ contained in a bank 1 of 7 registers ($BR_1$ to $BR_7$), each having eight bits; registers $BR_1$-$BR_7$ are used in calculating the change in linking address; unit 9 also receives instructions from memory unit 10. The outputs of address calculating unit 9 are directly connected to the address selecting inputs of the control memory 10.

The inputs of arithmetic logic unit 3 are responsive to outputs of register bank 1, containing the seven octal registers $BR_1$ to $BR_7$, and to an arithmetic unit 13 so unit 3 receives at the beginning of a cycle, an 8-bit byte produced from the data contained in double-word working registers $W_0$, $W_1$, $W_2$, $W_3$ which form a register bank 2. The register bank 2 contains double-word data and may be loaded either from a local memory 12 from a source external to the arrangement of the invention. The contents of register bank 2 are transferred either to an external device or to the input of the arithmetic logic unit 13. An input of arithmetic logic unit 13 is responsive to the contents of control register 11 to receive an operand for a microinstruction read from the local memory.

Figure 4B:
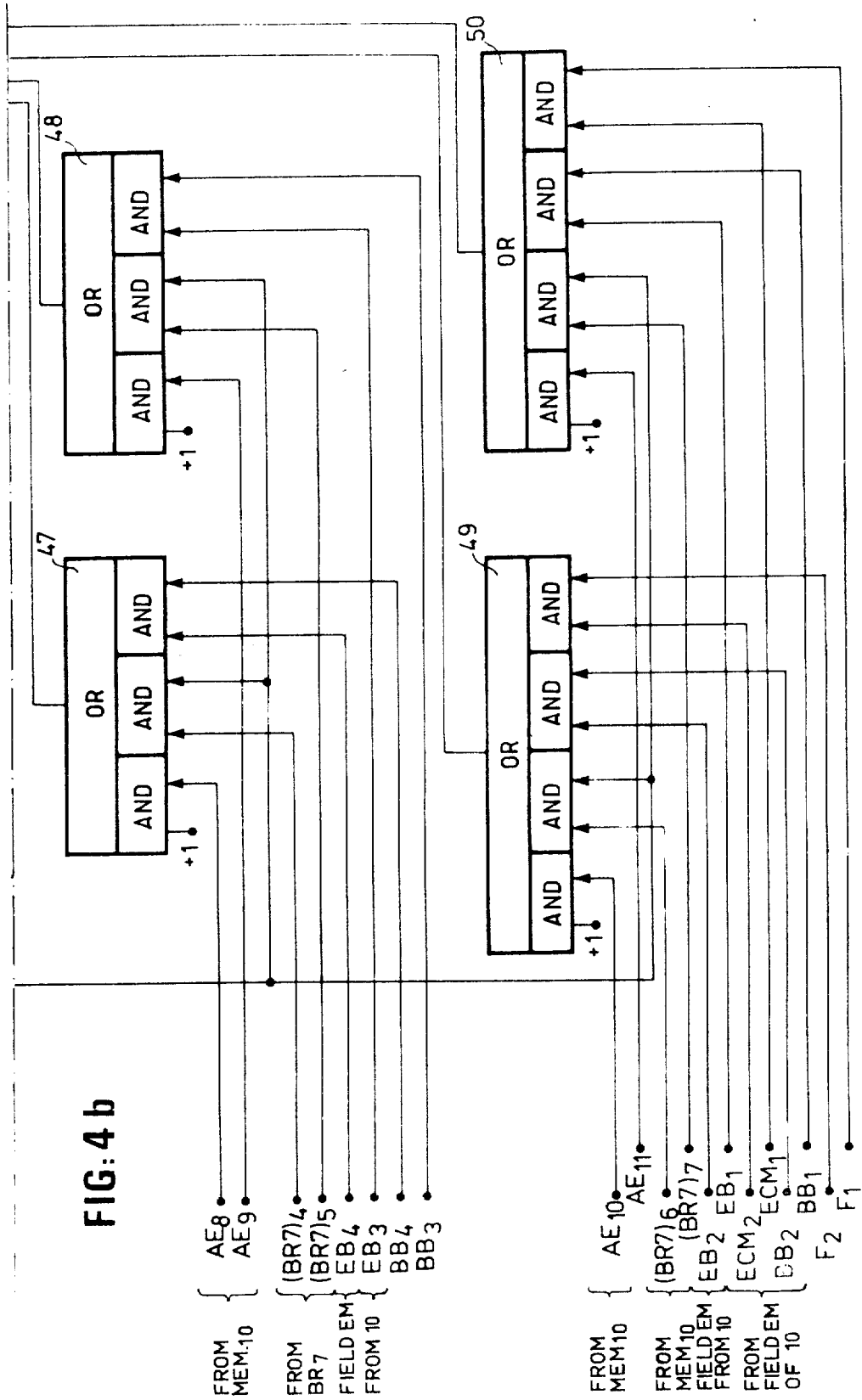

FIGS. 4A and 4B, together, are a block diagram of the address calculating unit 9 including the linking logic according to the invention. Unit 9 includes an instruction decoder 41 having inputs controlled by the outputs of an address selecting register SAR 42. In the example shown in FIG. 4, register SAR 42 contains flip-flops for storing address digits $X_0 X_1 AE_0$ to $AE_{11}$. The inputs of each of flip-flops $AE_4$ to $AE_{11}$ are respectively responsive to the outputs of "OR/AND" circuits 43 to 50. The inputs of flip-flops $X_0$, $X_1$, $AE_0$, $AE_1$, $AE_2$, $AE_3$ are connected directly to corresponding outputs (not shown) of control memory 10; these flip-flops store the most significant bits from the field AE which is read from the control memory 10 of FIG. 3.

Circuit 43 includes an OR circuit having two inputs connected to the outputs of a pair of two-input AND gates. The first AND gate has a first input always responsive to a logic 1 signal and a second input responsive to bit $AE_4$ of field AE of the microinstruction which is read from control memory 10. The second AND gate has one input responsive to bit $(BR_7)_\phi$ from register $BR_7$ of the register bank 1 and a second input responsive to bit $EBR_7$ from field EM of the microinstruction read from the control memory 10.

Circuit 44 includes an OR circuit having a pair of inputs responsive to the outputs of a pair of two input AND gates, one of which is always responsible to a binary one signal and to bit $AE_5$ of field AE of the microinstruction which is read from control memory 10. The inputs of the second AND gate are respectively responsive to bit $(BR_7)_1$ from register $BR_7$ in register bank 1, FIG. 3, and bit $EBR_7$ from field EM of the microinstruction read from control memory 10.

Circuit 45 includes an OR circuit having a pair of inputs responsive to the outputs of a pair of two input AND gates, one of which is always responsive to a binary one signal and bit $AE_6$ of field AE of the microinstruction which is read from the control memory 10. The inputs of the second AND gate are respectively responsive to bits $(BR_7)_2$ and $EBR_7$.

Circuit 46 similarly includes an OR circuit having a pair of inputs responsive to the outputs of a pair of two input AND gates, one of which is always responsive to a binary one signal and to bit $AE_7$ of field AE of the microinstruction read from the control memory 10. The inputs of the second AND gate are respectively responsive to bits $(BR_7)_3$ from register $BR_7$ and $EBR_7$.

Circuit 47 includes an OR circuit having three inputs which are responsive to the outputs of three two-input AND gates, one of which is always responsive to a binary one signal and to bit $AE_8$ from field AE of the microinstruction read from control memory 10. The two inputs of the second AND gate are respectively responsive to bits $(BR_7)_4$ and $EBR_7$. The two inputs of the third AND gate respond to a signal indicative of the state of flip-flop $BB_4$, in register 6, FIG. 3, and bit $EB_4$ from field EM of the microinstruction read from control memory 10.

Circuit 48 includes an OR circuit having three inputs connected to the outputs of three two-input AND gates, one of which is always responsive to a binary one signal and to bit $AE_9$ from field AE. The second AND gate is responsive to bit $(BR_7)_5$ from register $BR_7$ and at bit $EBR_7$ from field EM. The third AND gate is responsive to a signal indicative of the state of flip-flop $BB_3$ in register 6, and to bit $EB_3$ from field EM.

Circuit 49 includes an OR circuit having four inputs connected to the outputs of four two-input AND gates, one of which is always responsive to a binary one signal and bit $AE_{10}$ from field AE. The second AND gate is responsive to one input bit $(BR_7)_6$ from register $BR_7$ and bit $EBR_7$ from field EM. The third AND gate is responsive to a signal indicative of the state of the flip-flop $BB_2$, in register 6, and to bit $EB_2$ from field EM. The fourth AND gate is responsive to a signal indicative of the state of the flip-flop $F_2$, in register 5 of FIG. 3, and to bit $ECM_2$ from field EM.

Circuit 50 includes an OR circuit having four inputs connected to the output of four two-input AND gates, one of which is always responsive to a binary one signal and to bit $AE_{11}$ from field AE. The second AND gate is responsive to bits $(BR_7)_7$ from register $BR_7$ and $EBR_7$ from field EM. The third AND gate is responsive to bits $EB_1$ from field EM and a signal indicative of the state of flip-flop $BB_1$. The fourth AND gate is responsive to a signal indicative of the state of flip-flop $F_1$, in register 5, and bit $ECM_1$ from field EM.

Figure 5:
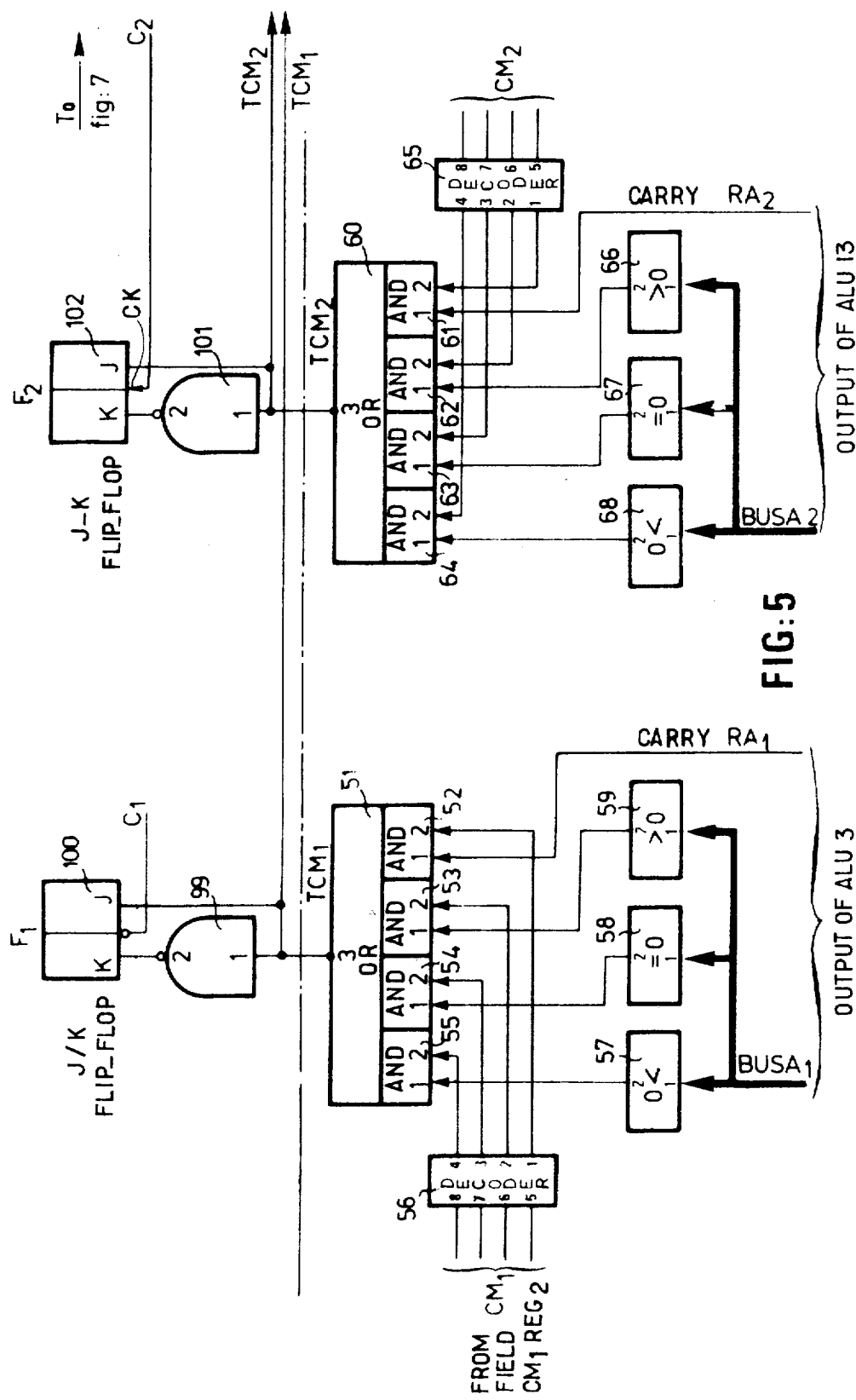
FIG. 5 is a block diagram of flip-flops $F_1$ and $F_2$ and the portion of the logic test unit (FIG. 3) associated with them.

The constituent parts of logic test unit 4 are illustrated schematically in FIG. 5. The bits to be tested come either from (1) the output of arithmetic logic unit 3, along BUS $A_1$, in which case the test is performed on eight bits; or (2) from arithmetic logic unit 13 along BUS $A_2$, in which case the test is performed on sixty-four bits. In FIG. 5, the tests shown are only those which enable negative, zero or positive values to be detected at the outputs of the two arithmetic logic units. It is to be understood that the number and particular character of these tests are not limiting and that other tests are envisaged. The tests on the 8-bit word (octets) on bus 41 are performed by circuits 57, 58 and 59. Circuit 57 detects a negative octet value, circuit 58 indicates that all the bits of the octet are zero and circuit 59 detects a positive octet value.

Figure 9:
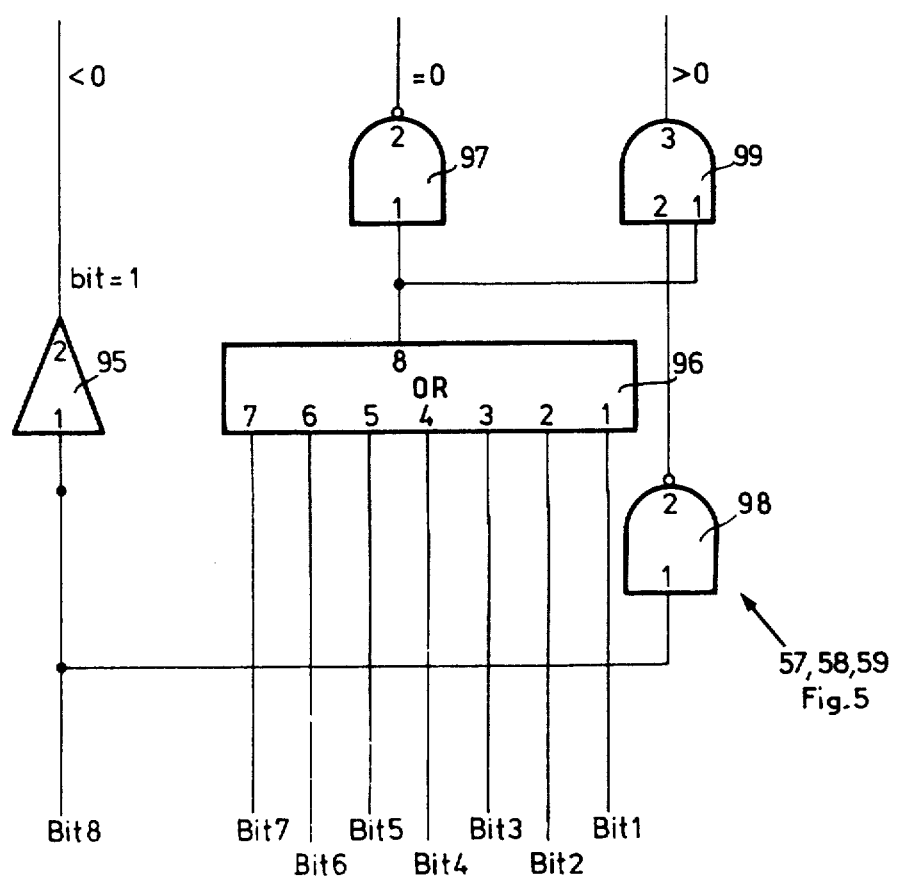
FIG. 9 is a circuit diagram of comparison circuitry included in FIG. 5.

Details of circuits 57–58 are shown in FIG. 9, a circuit diagram of the apparatus for testing one octent. It is assumed that the octet is negative if the value of bit 8 is 1; bit 8 is processed by amplifier 95, which derives a binary one output if the octet is less than zero. The zero test is performed by an OR gate 96 having seven inputs which is followed by an inverter 97. When all the bits at the inputs of OR gate 95 are zeros, the output of inverter 97 goes to the 1 level. The positive test is performed by OR gate 96, responsive to the value indicating bits 1–7, and a two-input AND gate 99. Output 8 of OR gate 96 is connected to input 1 of AND gate 99, while input 2 of AND gate 99 is connected to the output 2 of an inverter 98, having an input 1 responsive to polarity indicating bit 8. Thus, when bit 8 is zero, and at least one value indicating bit is at the 1 level, causing output 8 of OR gate 96 to be a one, the output of AND gate 99 goes to the 1 level to indicate a positive value on BUS $A_1$.

Returning to FIG. 5, output terminals 2 of circuits 57, 58 and 59 are connected to respective ones of the input terminals 1 of three AND gates 55, 54, 53, each of which has two inputs. A carry signal $RA_1$ derived by arithmetic unit 3 on bus $A_1$ is transmitted to input terminal 1 of AND gate 52. Input terminals 2 of AND gates 52–55 are respectively connected to output terminals 1–4 of a decoder 56, having input terminals 5, 6, 7 and 8 responsive to bits from field $CM_1$, as read from the control register 11. In this arrangement, a value of:

$CM_1 = 0001$ enables a test on the carry $RA_1$ by operating input terminal 2 of AND gate 52, $CM_1 = 0010$ enables a test on the output of member 59 by operating input terminal 2 of AND gate 53, $CM_1 = 0011$ enables a test on the output of circuit 58 by operating input terminal 2 of AND gate 54, $CM_1 = 0100$ enables a test on the output of circuit 57 by operating input terminal 2 of AND gate 55.

Output signals of AND gates 52 to 55 are fed to the inputs of four input terminal OR circuit 51 having an output terminal 3 for deriving a signal $TCM_1$ that reflects the results of the tests on the outputs of circuits 57 to 59 and indicates whether or not a carry is present.

Testing the outputs of arithmetic logic unit 13 is performed with similar circuits to those described supra for the output of unit 3; however, for unit 13, the tests are on a field of sixty-four bits. Bus $A_2$ is connected to the inputs of test circuits 66 to 68. Signals at output terminals 2 of test circuits 66 to 68 are fed to input terminals 1 of two-input AND gates 61 to 64, respectively. The carry bit $RA_2$ derived from arithmetic logic unit 13 on BUS $A_2$ is supplied to input terminal 1 of AND gate 61. Input terminals 2 of AND gates 61–64 are respectively responsive to signals at output terminals 1–4 of decoder 65, having input terminals 5–8 responsive to bits from field $CM_2$, as read from control register 11. With a value $CM_2 = 0001$ supplied to register 11 to decoder 65, the value of the carry bit $RA_2$ is transmitted through AND gate 61. With $CM_2 = 0010$, the value of the output of member 66 is transmitted through AND gate 62. With $CM_2 = 0011$, the output signal of test circuit 67 is transmitted through AND gate 63. When $CM_2 = 0100$, the output signal of circuit 68 is transmitted through AND gate 64. The output signals of AND gates 61 to 64 are fed to the inputs of a four-input OR gate 60 having an output terminal 3 on which is derived a signal $TCM_2$ indicative of the outputs of circuits 66 to 68 and whether or not a carry is present. The structure of circuits 66 to 68 is similar to that shown in FIG. 9 except that the test takes place on 64 bits.

The tests results, indicated by signals $TCM_1$ and $TCM_2$, are stored in JK flip-flops $F_1100$ and $F_2102$. Flip-flop $F_1$ includes a K input responsive to a $TCM_1$ signal at output terminal 2 of inverter 99, having an input terminal 1 responsive to signal $TCM_1$; a J input of flip-flop $F_1$, is directly responsive to signal $TCM_1$. Thus, when flip-flop $F_1$ receives a control signal $C_1$ at its CK input, the result of the test ordered by field $CM_1$ is transferred to flip-flop $F_1$. Similarly, flip-flop $F_2$ includes J and K inputs respectively responsive to signals $TCM_2$ and $\overline{TCM_2}$, as derived from OR gate 60 and output terminal 2 of inverter 101, having an input terminal 1 also responsive to the output of OR gate 60. Flip-flops $F_1$ and $F_2$ include clock input terminals DC, respectively responsive to control signals $C_1$ and $C_2$ from a suitable source, such as a clock, which enable the results of the tests ordered by fields $CM_1$ and $CM_2$ to be respectively transferred to flip-flops $F_1$ and $F_2$.

Circuits in logic test unit 4 for controlling J-K flip-flops $BB_1$ to $BB_4$ are now described with reference to FIGS. 6 and 7. Flip-flop $BB_1$ is controlled in response to the three-bit field $B_1$, as well as the test indicating signals $TCM_1$ and $TCM_2$. In general, the circuitry for controlling the J and K inputs of flip-flop $BB_1$ 69 includes decoder 78, as well as multiplexers 79 and 80, all of which have inputs responsive to field $B_1$. Decoder 78, as well as multiplexers 79 and 80, drive logic circuitry including OR gate 70, AND gates 71 and 73, OR gate 74, AND gates 75 and 76, as well as inverter 77. Decoder 78 responds to field $B_1$ to selectively complement flip-flop $BB_1$ 69, or to return the flip-flop to zero, depending upon the values of signals $TCM_1$ and $TCM_2$. The circuitry and operation of decoder 78, multiplexers 79 and 80, as well as gates 70–76 and inverter 77 is now described in detail.

Three-bit field $B_1$ (that controls flip-flop $BB_1$) of the microinstruction read from control register 11 is applied in parallel as inputs to terminals 8, 9 and 10 of multiplexer 79, terminals 1,2,3 of decoder 78, and terminals 8, 9, 10 of multiplexer 80. Decoder 78, illustrated in detail in FIG. 8, responds to field $B_1$ to generate a complementing signal command, COMP, for flip-flop $BB_1$, a zero-reset signal command, RAZ, for flip-flop $BB_1$, and an input signal for flip-flop $BB_1$. Bits $B_{10}$, $B_{11}$ and $B_{12}$ of field $B_1$ are respectively applied to input terminals 1 of inverters 98, 99 and 100, having output bits $B_{10}$, $B_{11}$, $B_{12}$ that are combined in AND gates with bits $\bar{B}_{10}$, $\bar{B}_{11}$ and $\bar{B}_{12}$. The signal to complement flip-flop $BB_1$ is generated at output terminal 4 of OR gate 107, having input terminals 1, 2 and 3 responsive to the signals at output terminals 4 of each of three input AND gates 101 to 103. Complementing signal COMP is derived by OR gate 107 in response to the bits derived from and supplied to inverters 98-100 in accordance with the logic equation:

$$\bar{B}_{10} \cdot \bar{B}_{11} \cdot \bar{B}_{12} + B_{10} \cdot \bar{B}_{11} \cdot \bar{B}_{12} + \bar{B}_{10} \cdot B_{11} \cdot \bar{B}_{12}.$$

Zero reset order RAZ is derived from output terminal 4 of AND gate 104 when the combination of signals supplied to and derived from inverters 98-100 is:

$$B_{10} \cdot B_{11} \cdot \bar{B}_{12}.$$

The instruction for supplying an input to flip-flop $BB_1$ is derived at output terminal 3 of OR gate 108, having one input terminal responsive to the output signal from AND gate 105 and another input terminal responsive to the output signal from AND gate 106. Gates 105 and 106 respond to the input and output bits of inverters 98-100 so the output signal of gate 108 is represented by:

$$\bar{B}_{10} \cdot \bar{B}_{11} \cdot B_{12} + B_{10} \cdot \bar{B}_{11} \cdot B_{12}.$$

Returning to FIG. 6, complementing signal COMP, derived at output terminal 4 of decoder 78, is applied to input terminals 2 and 1 of AND gates 72 and 75 respectively. Zero reset signal, RAZ, derived from output terminal 5 of decoder 78, is applied to input terminal 1 of an AND gate 73. The input signal to flip-flop $BB_1$ is derived at output terminal 6 of decoder 78 and is applied to input terminals 1 and 2 of AND gates 71 and 76. Output signals of AND gates 71, 72 and 73 are applied to the inputs of a three-input OR gate 70, having an output terminal 3 connected to the K input of flip-flop $BB_1$ 69. Output signals of AND gates 75 and 76 are applied to the inputs of a two-input OR gate 74, having an output terminal 3 connected to the J input of flip-flop $BB_1$ 69.

When the value of field $B_1$ is (000) (i.e., $B_{10}=B_{11}=B_{12}=0$) input terminal 1 of multiplexer 80 is fed through the multiplexer in parallel to inputs 1 and 2 of AND gates 72 and 75, respectively, which are enabled by the "COMP" signal derived at terminal 4 of decoder 78. The outputs of gates 74 and 75 thereby supply binary ones to the J and K inputs of flip-flop $BB_1$, whereby the next clock signal (from a suitable source, not shown) applied to the flip-flop CK input causes the former contents of flip-flop $BB_1$ to be complemented. When the value of field $B_1$ is 001 (i.e., $B_{10}=1$, $B_{11}=B_{12}=0$), test results signal $TCM_1$ at input terminal 2 of multiplexer 80 is fed through the multiplexer to inputs 1 and 2 respectively of gates 72 and 75; gates 72 and 75 are at this time enabled by signal COMP derived by decoder 78. If the test commanded by field $CM_1$ is satisfied, signal $TCM_1$ is set to the 1 level, whereby binary ones are applied to the J and K inputs of flip-flop $BB_1$ 69 so that the next clock signal applied to the CK input of flip-flop $BB_1$ 69 complements the flip-flop. When the value of field $B_1$ is 010 (i.e., $B_{10}=B_{11}=0$, $B_{12}=1$), the $TCM_2$ test result signal at input terminal 3 of multiplexer 80 is fed through the multiplexer to inputs 1 and 2 respectively of gates 72 and 75; gates 72 and 75 are at this time enabled in response to signal COMP, derived by decoder 78, being at their other inputs. If the test commanded by $CM_2$ is satisfied, signal $TCM_2$ is set to the 1 level, causing the J and K inputs of flip-flop $BB_1$ 69 to be also at the one level, again causing complementing of flip-flop $BB_1$.

If the value of field $B_1$ is 011 (i.e., $B_{10}=B_{11}=1$, $B_{12}=0$), signal $TCM_1$ at input terminal 5 of multiplexer 79 is fed through the multiplexer to input terminal 1 of inverter 77 and to input terminal 1 of AND gate 76. When signal $TCM_1=0$ (test commanded by $CM_1$ unsuccessful) a logic 1 is supplied by output terminal 2 of inverter 77 to input terminal 2 of AND gate 71. When signal $TCM_1=1$ (test on $CM_1$ successful) a logic 1 is supplied by output terminal 7 of multiplexer 79 to input terminal 1 of AND gate 76. The value of field $B_1$ being 011 also sets output 6 of decoder 78 to the 1 state and sets inputs 1 and 2 respectively of gates 71 and 76 to the 1 state. Thus, when signal $TCM_1=0$ the K input of flip-flop $BB_1$ 69 is set to logic 1 via AND gate 71 and OR gate 70, while when signal $TCM_1=1$ the J input of flip-flop $BB_1$ 69 is set to logic 1, via AND gate 76 and OR gate 74. Thus, with $TCM_1=0$, flip-flop $BB_1$ 69 is reset to zero in response to the next clock signal CK and with $TCM_1=1$ flip-flop $BB_1$ 69 will be set to 1 in response to the next clock signal CK. Finally, when the value of field $B_1$ is 100, the $TCM_2$ signal at input terminal 6 of multiplexer 79 is fed through the multiplexer to input terminal 1 of inverter 77 and to input 1 of AND gate 76. At the same time, a signal at the logic 1 level is derived at output terminal 6 of decoder 78. The same process as is described for the case where field $B_1=011$ is applicable, whereby signal $TCM_2=0$, causes flip-flop $BB_1$ 69 to assume the 0 state and signal $TCM_2=1$ causes the flip-flop to assume the 1 state.

Flip-flop $BB_2$ is controlled in response to two-bit field $B_2$, as well as test indicating signals $TCM_1$ and $TCM_2$. The circuitry for controlling flip-flop $BB_2$ 81 includes inverter 82, multiplexer 83 and OR gate 84. Multiplexer 83 responds to the command signal comprising field $B_2$, to control feeding of test indicating signals $TCM_1$ and $TCM_2$ to the input of flip-flop $BB_2$ 81. In addition, multiplexer 83 feeds the contents of flip-flop $BB_2$ 81 back to the flip-flop or the test signal $TCM_2$ to the flip-flop, under the control of field $B_2$.

The operation of the flip-flop $BB_2$ 81 shown in FIG. 7 is as follows. To enter a test result $TCM_1$ into flip-flop $BB_2$, multiplexer 83 responds to: the bits in field $B_2$, supplied to multiplexer terminals 5 and 6; and signal $TCM_1$, supplied to multiplexer input terminal 1 to the multiplexer output terminal 4. From terminal 4, signal $TCM_1$ is fed directly to the J input of flip-flop $BB_2$ 81; and the $TCM_1$ signal is also fed to the K input of flip-flop BB₂ 81 via inverter 82. In response to the next clock signal CK, signal TCM₁ is transferred to flip-flop BB₂ 81. To enter a test result TCM₂ into flip-flop BB₂, field B₂ activates multiplexer 83 so signal TCM₂, present at multiplexer input terminal 2, is fed directly to the J input of flip-flop BB₂; after inversion, signal TCM₂ is fed to the K input of the flip-flop. In response to the next clock signal CK, signal TCM₁ is transferred to flip-flop BB₂ 81.

OR gate 84 has a first input terminal responsive to the state of flip-flop BB₂, as derived from the flip-flop Q output terminal, and another input terminal responsive to the state of test CM₂, as indicated by signal TCM₂. Output terminal 3 of gate 84 is connected to input terminal 3 of multiplexer 83. Field B₂ activates multiplexer 83 so the signal at input terminal 3, the result of the logic OR correlation between the former contents of flip-flop BB₂ and the result of the test ordered by TCM₂, is transferred to flip-flop BB₂ in response to the next clock signal Ck.

Flip-flop BB₃ 90 responds to a number of signals derived from a prior art data processor (not shown) with which the microinstruction linking address calculating apparatus of the invention is associated. These previously alluded to signals, the derivation of which forms no part of the present invention, are: secondary order CSIO, bit 7 of the data processor program control register PCR, secondary order CSPR, bit 12 from the data processor instruction register ISR, and $\overline{\text{NOP}}$, as well as NOP, respectively indicative of a secondary order being and not being present. The two-bit field B₃ of the microinstruction read from the control register 11 is applied to inputs 6 and 7 of multiplexer 89 to enable the signals at multiplexer input terminals 1-4 to be selectively fed to the multiplexer output terminal 5. Multiplexer 89 input terminal 1 is responsive to the signal at output terminal 3 of OR circuit 85, in turn responsive to the outputs of AND gates 86 and 87. Input terminals 1 and 2 of gate 87 respectively respond to order CSPR and bit 7 from register PCR. Input terminals 1 and 2 of gate 86 respectively respond to: (a) signal TCM₁, (b) the signal at output terminal 3 of OR gate 88 that indicates the result of a logic OR correlation between signal TCM₁ and the state BB₃ of flip-flop BB₃, and (c) a signal indicating the state of flip-flop BB₂. The signal at output terminal 5 of multiplexer 89 is applied on the one hand to the J input of flip-flop BB₃ 90 and to input terminal 1 of inverter 90′, having an output terminal 2 connected to the K input of flip-flop BB₃. The signals at the J and K inputs to flip-flop BB₃ are coupled to a trigger input of the flip-flop to control its state in response to the signal at output terminal 3 of AND gate 90 having input terminals 1 and 2 respectively responsive to the clock signal H and the order signal $\overline{\text{NOP}}$. If the order NOP is present, no transfer operation takes place to flip-flop BB₃.

Thus, when input terminal 1 of multiplexer 89 is selected by a first combination of two-bit field B₃, the value of bit 7 from register PCR or the value of bit 12 from register ISR is transferred to flip-flop BB₃ 90, depending upon which of the orders CSPR or CSIO is present. When a second combination of the bits of field B₃ selects input terminal 2 of multiplexer 89, the test value TCM₁ is transferred to flip-flop BB₃. If field B₃ selects input terminal 3 of multiplexer 89, the result of the logic OR correlation between test result TCM₁ and the state of flip-flop BB₃ is transferred to flip-flop BB₃.

When input 4 of multiplexer 89 is selected by field B₃, the state of flip-flop BB₂ is transferred to flip-flop BB₃.

The control of flip-flop BB₄ 91 is in response to two-bit field B₄ of the microinstruction read from control register 11 that is applied to input terminals 6 and 7 of multiplexer 93 to selectively enable the signals at input terminals 1, 2, 3 and 4 of the multiplexer to be supplied to its output terminal 4. Input terminal 1 of multiplexer 93 is responsive to the output signal of AND gate 94, having input terminals 1 and 2 respectively responsive to bit 7 from register PCR and order CSPR. Input terminals 2, 3 and 4 of multiplexer 93 are respectively responsive to signals indicative of the contents of flip-flops BB₁, BB₂ and BB₃.

To enable the selective transfer of signals from the inputs of multiplexer 93 to flip-flop BB₄ 91, output terminal 5 of multiplexer 93 is connected to the K input of flip-flop BB₄ via an inverter 92, and is connected directly to the J input of the flip-flop. A trigger input to flip-flop BB₄ is controlled by the signal at output terminal 3 of AND gate 91 having first and second input terminals respectively responsive to clock signal H and signal $\overline{\text{NOP}}$. If signal NOP is present, no transfer takes place to flip-flop BB₄.

All the apparatus employed by the invention which has just been described may be produced with logic circuits described in the book entitled "Supplement to the TTL Data Book for Design Engineers" reference CC416, published by Texas Instrument Company, or in the book issued by the same company entitled "The TTL Data Book for Design Engineers", reference CC411.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A method of determining linking addresses of microinstructions contained in a control memory of a microprogrammed data processing system, the system including storage elements for bit values of predetermined signals, the microinstructions occurring in cycles so microinstruction cycle (n+1) follows microinstruction cycle n, each microinstruction cycle including a preparation phase during which microinstructions are prepared, each preparation phase being followed by an execution phase during which a microinstruction at an address supplied to the control memory is executed by the system, the microinstruction of cycle n contained in the control memory having (a) a first bit field indicating a microinstruction linking address to the microinstruction of cycle (n+1) unless modified during cycle n, the microinstruction linking address to the microinstruction of cycle (n+1) being susceptible of being modified during the preparation phase of cycle n in response to the predetermined signals stored in the storage elements, (b) a second bit field selectively designating which storage elements contain the predetermined signals that can control the first bit field, and (c) a third bit field for selectively enabling changes to be made in the storage elements, the system further including an address register for the first bit field; comprising, during cycle n, performing the steps of:

(1) selectively enabling the bit values of signals in predetermined ones of the storage elements to be changed in response to predetermined values of the third field;

(2) then selectively modifying values of bits in the first field of the microinstruction stored in the control memory in response to the values of bits of the signals in storage elements selected by the second field whereby a selectively modified first field is derived;

(3) storing the selectively modified first field in the address register as an address indication for cycle (n+1); and (4) then supplying the address indicated by the selectively modified first field in the address register to the control memory, whereby during the execution phase of cycle (n+1) the microinstruction at the address supplied to the control memory during cycle n is executed.

2. The method of claim 1 wherein the data processing system includes an arithmetic logic unit which derives an output capable of having different values, and step (1) includes: selectively modifying the bit values stored in one of said storage elements in response to a predetermined condition for the value of the output of the logic unit and a predetermined combination of bits of the third field.

3. The method of claim 1 wherein step (2) includes: (i) controlling the value of a first predetermined bit in the first bit in the first field in the address register in response to the value in one of the storage elements and a predetermined value of a first bit of the second field, and (ii) controlling the value of a second predetermined bit in the first field in the address register in response to the value in the further storage element and a predetermined value for a second bit of the second field.

4. The method of claim 1 wherein the data processing system includes an arithmetic logic unit which derives an output capable of having values with first and second predetermined conditions and step (1) includes:

(i) controlling the bit values stored in one of the storage elements in response to the logic unit output having a value satisfying the first predetermined condition while the third field has a first predetermined combination of bit values, and (ii) controlling the bit values stored in said one of the storage elements in response to the logic unit output values satisfying the second predetermined condition while the third field has a second predetermined combination of bit values.

5. The method of claim 1 wherein the data processing system includes an arithmetic logic unit which derives an output capable of having a value of zero, a negative value, a positive value and a carry, and step (1) includes:

(i) controlling the bit value stored in one of the storage elements in response to the arithmetic logic unit deriving the zero value while the third field has a first combination of bit values;

(ii) controlling the bit value stored in said one storage element in response to the arithmetic logic unit deriving a positive value while the third field has a second combination of bit values, (iii) controlling the bit value stored in said one storage element in response to the arithmetic logic unit deriving a negative value while the third field has a third combination of bit values, and (iv) controlling the bit value stored in said one storage element in response to the arithmetic logic unit deriving a carry while the third field has a fourth combination of bit values.

6. The method of claim 1 wherein the data processing system includes first and second arithmetic logic units, each of said arithmetic logic units deriving an output capable of having a value of zero, a negative value, a positive value and a carry, the third field being divided into first and second sub-fields, and step (1) inclues:

(i) controlling the bit value stored in a first of the storage elements in response to the first arithmetic logic unit deriving the zero value, a positive value, a negative value and a carry while the first sub-field respectively has first, second, third and fourth combinations of binary bit values, so that the bit stored in said first storage element has a first binary value in response to:

(1) the first arithmetic logic deriving the zero value while the first sub-field has the first combination of bit values, (2) the first arithmetic logic unit deriving the positive value while the first sub-field has the second combination of bit values, (3) the first arithmetic logic unit deriving the negative value while the first sub-field has a third combination of bit values, and (4) the first arithmetic logic unit deriving the carry while the first sub-field has a fourth combination of bit values, and (ii) controlling the bit value stored in a second of the storage elements in response to the second arithmetic logic unit deriving the zero value, a positive value, a negative value and a carry while the second sub-field respectively has first, second, third and fourth combinations of bit values, so that the bit stored in said second storage element has a first binary value in response to:

(1) the second arithmetic logic unit deriving the zero value while the second sub-field has the first combination of bit values, (2) the first arithmetic logic unit deriving the positive value while the second sub-field has the second combination of bit values, (3) the second arithmetic logic unit deriving the negative value while the second sub-field has the third combination of bit values, and (4) the second arithmetic logic unit deriving the carry while the second sub-field has the fourth combination of bit values.

7. The method of claim 1 wherein the data processing system includes first and second arithmetic logic units, each of said arithmetic logic units deriving an output capable of having first and second differing conditions, the third field being divided into first and second sub-fields, and step (1) includes:

(i) controlling the value of the bit stored in a first of the storage elements in response to the first arithmetic logic unit having an output that satisfies the first condition while the first sub-field has a first combination of bit values, (ii) controlling the value of the bit stored in the first of the storage elements in response to the first arithmetic logic unit having an output that satisfies the second condition while the first sub-field has a second combination of bit values, (iii) controlling the bit value stored in a second of the storage elements in response to the second arithmetic logic unit having an output that satisfies the second condition while the second sub-field has a first combination of bit values, and (iv) controlling the bit value stored in the second of the storage elements in response to the second arithmetic logic unit having an output that satisfies the second condition while the second sub-field has a second combination of bit values.

8. Apparatus for determining linking addresses of microinstructions of a microprogrammed data processing system comprising a control memory for the microinstructions, storage elements for bit values of predetermined signals, the microinstructions occurring in cycles so microinstruction cycle (n+1) follows microinstruction cycle n, each microinstruction cycle including a preparation phase during which microinstructions are prepared, each preparation phase being followed by an execution phase during which a microinstruction at an address supplied to the control memory is executed by the system, the microinstruction of cycle n having: (a) first bit field designating a microinstruction linking address to the microinstruction of cycle (n+1) unless modified during cycle n, the microinstruction linking address to the microinstruction of cycle (n+1) being susceptible of being modified during the preparation phase of cycle n in response to the predetermined signals stored in the storage elements, (b) a second bit field selectively designating which storage elements contain the predetermined signals that can alter the first bit field, and (c) a third bit field for selectively enabling changes to be made in the storage elements, an address register for the first bit field, the microinstruction of cycle n being read out of the control memory during the preparation phase of cycle n, means for selectively enabling the signals in predetermined ones of the storage elements to be changed in response to predetermined bit values of the third field read out of the control memory during the preparation phase of cycle n, means for selectively modifying the values of bits in the first field in the address register in response to signals in the storage elements selected by the second field read out of the control memory during the preparation phase of cycle n and the values of bits of the first field read out of the control memory during the preparation phase of cycle n, and means for supplying the control memory with the address indicated by the first field in the address register as controlled by the means for controlling during the cycle n, whereby during the execution phase of cycle (n+1) the microinstruction at the address supplied to the control memory during cycle n is executed.

9. The apparatus of claim 8 wherein the data processing system includes an arithmetic logic unit which derives an output capable of having different values, the means for enabling signals in the storage elements to be changed comprising means for controlling a bit value stored in one of the storage elements in response to a predetermined condition for the value of the output of the logic unit and a predetermined combination of bits of the third field.

10. The apparatus of claim 8 wherein the means for selectively modifying the values of bits in the first field in the storage register includes:
 (i) means for controlling the value of a first predetermined bit in the first field in the address register in response to a bit value in one of the storage elements and a predetermined value of a first bit of the second field,
 (ii) means for controlling the value of a second predetermined bit in the first field in the address register in response to the value in the further storage element and a predetermined value of a second bit of the second field.

11. The apparatus of claim 8 wherein the data processing system includes an arithmetic logic unit which derives an output capable of having values with first and second predetermined conditions, the means for enabling signals in the storage elements to be changed comprising means for controlling the bit values stored in one of the storage elements in response to the first and second conditions for the values of the logic unit output being satisfied while first and second predetermined bit values of the third field are respectively derived.

12. The apparatus of claim 8 wherein the data processing system includes an arithmetic logic unit which derives an output capable of having a value of zero, a negative value, a positive value and a carry, the means for enabling signals in the storage elements to be changed comprising means for controlling the bit values stored in one of the storage elements in response to the arithmetic logic unit deriving the zero value, a positive value, a negative value and a carry while the third field respectively has first, second, third and fourth combinations of bit values.

13. The apparatus of claim 8 wherein the data processing system includes first and second arithmetic logic units, each of said arithmetic logic units deriving an output capable of having a value of zero, a negative value, a positive value and a carry, the third field being divided into first and second sub-fields, the means for enabling signals in the storage elements to be changed comprising means for controlling the bit values stored in a first of the storage elements in response to the first arithmetic logic unit deriving the zero value, a positive value, a negative value and a carry while the first sub-field respectively has first, second, third and fourth bit value combinations, and means for controlling the bit values stored in a second of the storage elements in response to the second arithmetic logic unit deriving the zero value, a positive value, a negative value and a carry while the second sub-field respectively has first, second, third and fourth combinations of bit values.

14. The apparatus of claim 8 wherein the data processing system includes first and second arithmetic logic units, each of said arithmetic logic units deriving an output capable of having first and second differing conditions, the third being divided into first and second sub-fields, the means for enabling signals in the storage elements to be changed comprising:
 (1) means for controlling the values of the bits stored in a first of the storage elements in response to the first arithmetic logic unit having an output that satisfies the first and second conditions while the first sub-field respectively has first and second combinations of binary bits values, and
 (2) means for controlling the bit values stored in a second of the storage elements in response to the second arithmetic logic unit having an output that satisfies the first and second conditions while the second sub-field respectively has first and second combinations of binary bit values.

15. A method of determining linking addresses of microinstructions contained in a control memory of a microprogrammed data processing system, the system including storage elements for bit values of predetermined signals, the microinstructions occurring in cycles so microinstruction cycle (n+1) follows microinstruction cycle n, each microinstruction cycle including a preparation phase during which microinstructions are prepared, each preparation phase being followed by an execution phase during which a microinstruction at an address supplied to the control memory is executed by the system, the microinstruction of cycle n contained in the control memory having (a) a first bit field indicating a microinstruction linking address to the microinstruction of cycle (n+1) unless modified during cycle n, the microinstruction linking address to the microinstruction of cycle (n+1) being susceptible of being modified during the preparation phase of cycle n in response to the predetermined signals stored in the storage elements, (b) a second bit field selectively designating which storage elements contain the predetermined signals that control the first bit field; comprising, during cycle n, performing the steps of:

(1) selectively modifying values of bits in the first field of the microinstructions stored in the control memory in response to the values of bits of the signals in storage elements selected by the second field whereby a selectively modified first field is derived;

(2) storing the selectively modified first field in the address register as an address indication for cycle (n+1); and (3) then supplying the address indicated by the selectively modified first field in the address register to the control memory, whereby during the execution phase of cycle (n+1) the microinstruction at the address supplied to the control memory during cycle n is executed.

16. Apparatus for determining linking addresses of microinstructions of a microprogrammed data processing system comprising a control memory for the microinstructions, storage elements for predetermined signals, the microinstructions occurring in cycles so microinstruction cycle (n+1) follows microinstruction cycle n, each microinstruction cycle including a preparation phase during which microinstructions are prepared, each preparation phase being followed by an execution phase during which a microinstruction at an address supplied to the control memory is executed by the system, the microinstruction of cycle n having: (a) a first bit field designating a microinstruction linking address to the microinstruction of cycle (n+1) unless modified during cycle n, the microinstruction linking address to the microinstruction of cycle (n+1) being susceptible of being modified during the preparation phase of cycle n in response to the predetermined signals stored in the storage elements, (b) a second bit field selectively designating which storage elements contain the predetermined signals that can control the first bit field, (c) an address register for the first bit field, the microinstruction of cycle n being read out of the control memory during the preparation phase of cycle n, means for selectively modifying the values of bits in the first field in the address register in response to the signals in the storage elements selected by the second field read out of the control memory during the preparation phase of cycle n and the values of bits of the first field read out of the control memory during the preparation phase of cycle n, and means for supplying the control memory with the address indicated by the first field in the address register as controlled by the means for controlling during cycle n, whereby during the execution phase of cycle (n+1) the microinstruction at the address supplied to the control memory during cycle n is executed.

* * * * *